United States Patent [19]

Shahrokh

[11] Patent Number: 4,952,007

[45] Date of Patent: Aug. 28, 1990

[54] TRANSPORTATION VEHICLE COVER AND REFASTENABLE EXTERIOR CONNECTING SYSTEM

[76] Inventor: Riaz D. Shahrokh, 6035 Rowan Way, Citrus Heights, Calif. 95621

[21] Appl. No.: 368,199

[22] Filed: Jun. 19, 1989

[51] Int. Cl.⁵ .............................................. B60J 7/00
[52] U.S. Cl. ................................... 296/95.1; 296/136
[58] Field of Search ............................. 296/136, 95.1; 150/52 K; 135/88

[56] References Cited

U.S. PATENT DOCUMENTS

| | | | |
|---|---|---|---|
| 3,763,908 | 10/1973 | Norman | 150/52 |
| 3,910,330 | 10/1975 | Johnson | 150/52 |
| 4,154,254 | 5/1979 | Spencer | 135/4 |
| 4,164,233 | 8/1979 | McAndrew | 135/5 |
| 4,184,501 | 1/1980 | Johnson | 135/1 |
| 4,202,396 | 5/1980 | Levy | 160/107 |
| 4,209,197 | 6/1980 | Fischer | 296/216 |
| 4,216,989 | 8/1980 | Tackett | 296/136 |
| 4,355,839 | 10/1982 | Rosen | 296/136 |
| 4,432,581 | 2/1984 | Guma | 296/136 |
| 4,519,644 | 5/1985 | Song | 296/136 |
| 4,596,418 | 6/1986 | Koh | 296/136 |
| 4,726,406 | 2/1988 | Weatherspoon | 150/52 |
| 4,795,207 | 1/1989 | Clarke | 296/136 |
| 4,799,728 | 1/1989 | Akers | 296/136 |
| 4,825,889 | 5/1989 | Monteith | 296/136 |

Primary Examiner—Robert R. Song

[57] ABSTRACT

The invention consists of cover (20) for covering vehicle (40) used to transport people and a releasable connecting system which releasably connects cover (20) to vehicle (40) outside of vehicle (40). Cover (20) is a flexible sheet that is sized and shaped to cover the exterior surfaces of the passenger compartment (41) of vehicle (40). The opaque and reflective qualities of cover (20) pervent compartment (41) from getting uncomfortably hot or damaged from exposure to summer sun. Use of cover (20) during winter shields the vehicle's windows from ice and snow. Cover (20) and connecting system also serve to deter and resist entry of unauthorized persons into vehicle (40). The first typical embodiment of the connecting system includes arm (31), fastener (32), and anchor (33). Arm (31) is an elongated member with one end joined to cover (20) and the other end releasably connected by fastener (32) to anchor (33). Fastener (32) is accessible from outside vehicle (40). Anchor (33) is initially attached to vehicle (40) by sliding anchor (33) on vehicle's door edge (51). Anchor (33) pinches door edge (51) and can be removed from door (50) only when door (50) is open. Anchor (33) remains attached to vehicle (40) when cover (20) is on vehicle (40) or removed from vehicle (40). For any embodiment of cover (20) and connecting system, no doors (50) or other closure members need to be opened to allow removal of cover (20) from vehicle (40).

15 Claims, 6 Drawing Sheets

TRANSPORTATION VEHICLE COVER AND REFASTENABLE EXTERIOR CONNECTING SYSTEM

BACKGROUND

Field of Invention

This invention relates to a cover for covering a vehicle which transports people and to the connecting system which connects the cover to the vehicle.

People dislike entering an extremely hot vehicle and dislike sun damage to their vehicle's fabrics, vinyls, plastics, and other parts. Fold out cardboard shields, such as U.S. Pat. No. 4,202,396 to Levy (1980) do not shield enough of the vehicles's interior to cool the vehicle much or protect it much from sun damage. Full length covers are readily available and offer much better protection than cardboard shields. Although full length covers are available today, they are not used as much as cardboard shields because they are difficult and time consuming to put on the vehicle, cost too much, and can be readily stolen. A mini-cover which covers only the passenger compartment is the best solution. It protects the vehicle's important parts from sun caused damage and excessive heat increase. The mini-cover is quick and easy to install and inexpensive. However, the connecting system which prevents or resist removal of the mini-cover from the vehicle needs to be quick and easy to use, practical, and inexpensive to manufacture; prior art has failed to produce such a connecting system.

Prior art for covers and connecting systems have negative qualities that cause people to avoid buying and using them. Prior art is either difficult to use, too time consuming to use, complicated, too expensive, or too damaging to the vehicle. Prior art for connecting systems does not provide primary connection of the cover to the vehicle by use of (1) an anchor which is attached to the vehicle and remains with the vehicle when the cover is removed; and (2) a fastener member which is outside the vehicle and releasably connects the cover to the anchor or connects the cover to an arm member secured to the vehicle. The anchor would make connection of the cover to the vehicle easier and quicker than prior art.

The closes prior is U.S. Pat. No. 4,209,197 to Fischer (1980). However, Fischer's invention does not provide a releasable anchor attached to the vehicle with the anchor having a means to receive a separate fastener; the fastener would connect the cover to the anchor or connect an arm of the cover to the anchor. Fischer's invention also involves too many parts requiring too much time to be installed in order to secure the cover to the vehicle. It involves multiple clamping strips that wedge the cover into grooves in the vehicle. It involves nipples fixed to the vehicle's rain gutter. The nipples are pushed through grommets attached to the cover. Also, the invention requires a rain gutter on the vehicle, which my invention does not require. Fischer's invention also comprises a cover which is divided into two or more sections which must be joined to each other to form a complete cover. This cover joining process is difficult and time consuming.

The simplest invention for a connecting system in common use with full length vehicle covers is difficult to use, when compared to my invention. It consists of a cable running underneath the vehicle between the front and rear tires with the ends of the cable joined to opposite sides of the cover. One joint of the cover and cable involves a lock. The cable is difficult to install since a person must toss the cable under the vehicle in such a way that the opposite end of the cable falls on the other side of the vehicle and not underneath the vehicle. If the end is not tossed far enough, the person may have to kneel on the ground to retrieve the tossed end from underneath the vehicle. The cable and the person's clothing may become soiled due to contact with the ground during the installation process.

Another invention which is difficult to install and use is U.S. Pat. No. 4,596,418 to Koh (1986). It is attached to the underside of a trunk lid. Rolling or folding the cover back into the storage compartment to which the cover is attached is difficult and time consuming. Attaching the cover to hooks fixed to the underside of the vehicle is also time consuming and difficult.

Another invention which is difficult to use is U.S. Pat. No. 4,355,839 to Rosen (1982). It has straps secured to various locations on the inside of the cover with a large bulb on the free end of each strap. It is difficult to place the free ends in the passenger compartment and close the doors on the straps while simultaneously preventing any free ends from coming out. The free ends secure the cover to the vehicle because the free ends can not pass between the passage between the door edge and door frame. It is difficult and time consuming to remove the straps from the vehicle. A person must roll up the sides of the cover and place the cover's sides on the roof of the vehicle in order for a person to have access to open the doors. By opening the doors, the free ends can be removed from the compartment.

U.S. Pat. No. 4,726,406 to Weatherspoon (1988) provides a cover for windows with straps joined to the cover. The straps are fastened to mating fasteners fixed to the interior of the vehicle. Using the invention requires: placing the cover on the windshield, getting into the vehicle, and fastening the ends of the straps to mating fasteners inside the interior of the vehicle while holding the cover in place. This is difficult and time consuming.

U.S. Pat. No. 4,799,728 to Akers (1989) is for a cover with a bag attached to the cover. The bag is placed in the vehicle with the door closed on it. This serves to secure the cover to the vehicle in a similar manner as U.S. Pat. No. 4,355,839 to Rosen (1982). It also includes straps attached to the cover with their free ends fixed to semipliable hooks. The hooks are bent to grip a fender well or other vehicle feature. Constantly bending and unbending the hooks seems difficult, time consuming, and damaging to the vehicle's paint by the abrasive action of the hook pressing dirt against the vehicle's paint. If the portion of the vehicle to which the hooks grip is soiled, the hooks may become soiled. Using soiled hooks may soil the hands of the user. If the cover and hooks are stored together, the cover may also become soiled. Finally, the soiled cover could scratch the vehicle's paint if the soil contains abrasives. The connecting system does not contain any part which remains with the vehicle to make reconnection of the cover to the vehicle easy, quick, and less damaging to the vehicle.

U.S. Pat. No. 4,795,207 to Clarke (1989) has a cover with an elasticized bottom hem, grommets on each bottom side of the cover for connection of a rope running under the middle of the vehicle, and a port hole in the cover which allows a part of the vehicle or a cable to extend through it. A lock can be attached to the part or cable extending through the port hole and secure the cover by being too large to be able to be passed back through the port hole. This invention has a difficult to use rope running under the vehicle. Using a cover with an elasticized hem is difficult and awkward. The port hole is an impractical feature because there is no uniform sized part on most vehicle to fit through the port hole. And, there are not many protruding parts on vehicles with features that can be locked to by common locks. The connecting system does not contain any part which remains with the vehicle to make reconnection of the cover to the vehicle easy and quick.

There are several inventions which are too complicated and expensive such as U.S. Pat. No. 4,154,254 to Spencer (1979) which involves a lever, ribs, straps, bars, and other mechanical parts including an optional beanie twirler on top.

U.S. Pat. No. 4,519,644 to Song (1985) is another invention for covers that is too complicated and too expensive. It has an excessive number of parts and is expensive to manufacture. It is comprised of an accordion like arrangement of ribs attached to the cover. The ribs supposedly aid the process of unfolding the cover over the longitudinal length of the vehicle.

Inventions that create an air space between the cover and vehicle are complicated, expensive to manufacture, or difficult to use. These include U.S. Pat. No. 4,184,501 to Johnson (1980), U.S. Pat. No. 4,432,581 to Guma (1984) and U.S. Pat. No. 4,164,233 to McAndrew (1979). A simple flexible cover can reduce interior temperatures without such complicated and expensive parts needed to create the air space.

U.S. Pat. No. 4,216,989 to Tackett (1980) is an example of prior art which causes too much damage to the vehicle, is too complex, and is too expensive. The container of the cover, being a device which also connects the cover to the vehicle, is secured to the roof of the vehicle, has an ejection device to eject the cover from the container, and contains the cover when the cover is folded up into the container. Securing the container to the vehicle involves damaging the vehicle by screwing the container to the roof of the vehicle. U.S. Pat. No. 4,596,418 to Koh (1986), previously mentioned, involves damage to the vehicle by fixing hooks to the underside of the vehicle.

Magnets used as the primary means to secure the cover to the vehicle are impractical because magnets do not prevent removal of the cover by strong gusts of wind. Some inventions use additional securing means to supplement the magnets. This combination involving magnets is unnecessary and causes the cover and connecting means to be too expensive. An invention having straps connected to the underside of a vinyl plastic cover, the straps connected to the interior of the vehicle, and magnets used to secure the cover to the vehicle's exterior is U.S. Pat. No. 3,910,330 to Johnson (1975). U.S. Pat. No. 3,763,908 to Norman (1973) uses magnets as the primary means of securing the cover to the vehicle. Straps are used to supplement the magnetic securing of the cover. The straps are clamped by the window. Clamping the straps by closing the window is time consuming and difficult to do.

Full length covers are difficult and time consuming to use because they are large, bulky, difficult to remove, difficult to fold up and store, and difficult to put on the vehicle. Prior art for connecting systems are neither simple nor inexpensive.

OBJECTS AND ADVANTAGES

Accordingly, besides objects and advantages of covers and connecting systems described in my above patent, a number of objects and advantages of the present invention are:

1. To provide a cover which reduces damage and temperature increase of at least the passenger compartment of a vehicle used to transport people caused by exposure of the vehicle to sun light. This, in turn, is to reduce the initial amount of energy required by the passenger compartment's cooling system to cool the passenger compartment temperature down to a comfortable level.

2. To provide a cover which reduces the amount of radiant heat entering the passenger compartment from the exterior surfaces of the vehicle including the exterior surface above which the vehicle's motor when the motor is hot.

3. To provide a cover which reduces the amount of surface contact between natural and man-made elements of the environment and the vehicle's exterior surfaces.

4. To provide a cover which can be used to remove elements of nature, such as to remove snow from the vehicle's window, that would naturally accumlate on the vehicle's exterior surfaces.

5. To provide a cover which conceal valuable items or packages stored in the passenger compartment from the view of people outside the vehicle.

6. To provide a connecting system which releasably connects the cover to the vehicle.

7. To provide a connecting system which releasably connects the cover to the vehicle outside of the vehicle.

8. To provide a connecting system which does not require any door or other closure member to be opened in order to connect the cover to the connecting system or to remove the cover from the connecting system.

9. To provide a connecting system which includes an anchoring part which is detachable from the connecting system. The anchoring part is to remain attached to the vehicle when the cover is removed from the vehicle and when the cover is connected to the vehicle.

10. To provide a connecting system which prevents removal of the cover from the vehicle by natural causes, such as wind.

11. To provide an arrangement of a cover and connecting system to resist and deter entry of an unauthorized person into the vehicle.

Further objects and advantages are to provide a connecting system which is quick and easy to use, is easy to initially install, is uncomplicated, is inexpensive, does not damage the vehicle, and has parts that are already available.

Further objects and advantages are to provide a cover which is easy to remove, not bulky, easy to fold up and store, easy to put on the vehicle, easy to connect to the vehicle, and involves a connection procedure that does not require a person to bend over very far to connect the cover to the vehicle.

Still further objects and advantages of my invention will become apparent from a review and consideration of the following description of the drawings, description of invention, and drawings of my invention.

| LIST OF REFERENCE NUMBERS |
| --- |
| 20. Cover |
| 21. Hem |
| 31. Arm |
| 32. Fastener |
| 33. Anchor |
| 34. Receiver |
| 35. Pulling Member |
| 36. Retracting Member |
| 37. Ventilation System |
| 38. Bracing Member |
| 40. Vehicle |
| 41. Compartment |
| 42. Component |
| 50. Door |
| 51. Door Edge |
| 52. Door Frame |

| -continued |
| --- |
| LIST OF REFERENCE NUMBERS |
| 54. Space |
| 55. Passage |
| 60. Chain |

DESCRIPTION OF INVENTION

Figure 1:
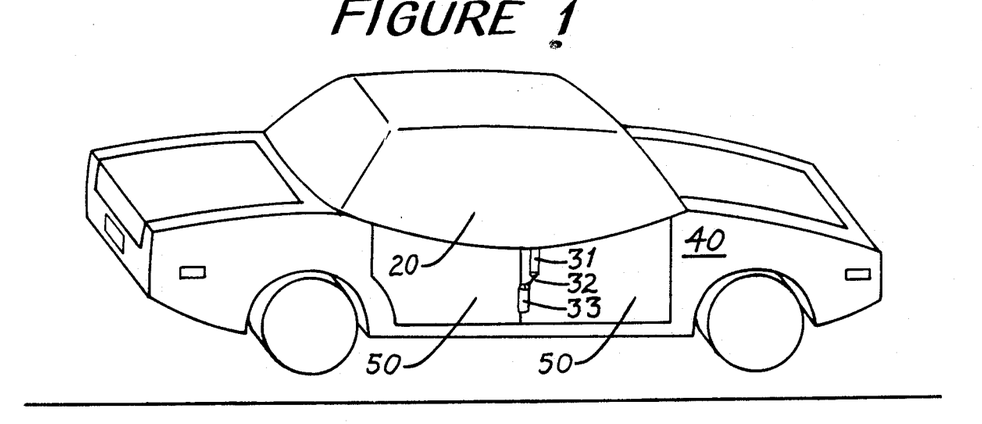
FIG. 1 is a perspective view of the first typical embodiment of the cover showing a typical vehicle, a cover shielding the vehicle's passenger compartment, and a connecting system connected to a door edge.

The first typical embodiment of a cover 20 is shown in FIG. 1 and is described as follows. Cover 20 is sized and shaped to cover exterior surfaces of an upper portion of a vehicle 40 (vehicle shall mean a vehicle 40 used to transport people such as an automobile, pick-up truck, truck, van, jeep, bus, motorcylce, boat, or airplane) and a vehicle's passenger compartment 41 (compartment shall mean a resealable enclosed space inside vehicle 40 such as a passenger compartment, motor compartment, or trunk) and may cover portions of other exterior surfaces of vehicle 40. Cover 20 is sized and shaped to cover exterior surfaces of compartment 41 including the roof, windows, and surfaces between windows of compartment 41. Cover 20 is sized and shaped to cover a minority portion of exterior surfaces directly over a vehicle's motor compartment 41. Cover 20 is made of a flexible material with a surface that reflects light such as a cloth fabric having a reflective, metallic coated outer surface. Cover 20 is shear resistant, of high-tensile strength, and resistant to common types of destruction. Cover 20 has a hem 21 (hem shall mean the peripheral border of cover 20). Hem 21 is reinforced to provide higher tensile and shear strengths at hem 21 than at the body of cover 20.

Figure 2:
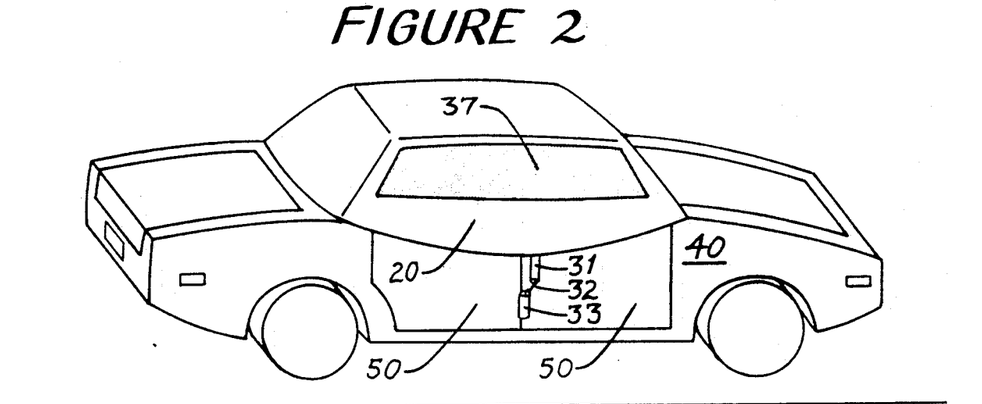
FIG. 2 is a perspective view of the second typical embodiment of the cover similar to FIG. 1 but also including a ventilation system over an openable window area.

The second typical embodiment of cover 20 is shown in FIG. 2 and is described as follows. Cover 20 is similar to cover 20 previously described in the first typical embodiment of cover 20. However, cover 20 also includes a ventilation system 37 which allows air to flow through at least a portion of cover 20 and through compartment 41. Ventilation system 37 illustrated is made of a fabric with holes in it similar to fabric used of jersey shirts used by football players.

Figure 3:
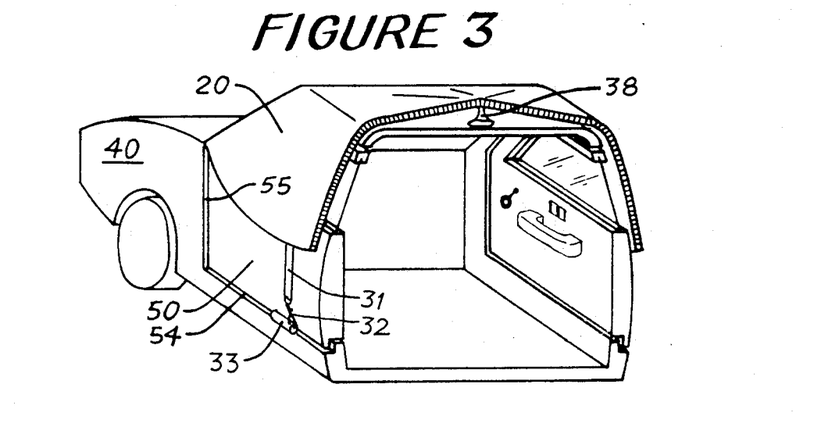
FIG. 3 is a perspective, cut-away view of the third typical embodiment of the cover showing the cover separated from the top of the vehicle by a bracing member, and an alternate location of connection of the connecting system to the bottom of a door on the door's edge.

The third typical embodiment of cover 20 is shown in FIG. 3 and is described as follows. Cover 20 is similar to cover 20 previously described in the first typical embodiment of cover 20. However, cover 20 also includes a bracing member 38 located between cover 20 and vehicle 40. Bracing member 38 keeps cover 20 away from vehicle 40, and bracing member 38 provides an air space between cover 20 and vehicle 40. Bracing member 38 also increases the shedding of rain or other precipitation off cover 20.

Figure 4A:
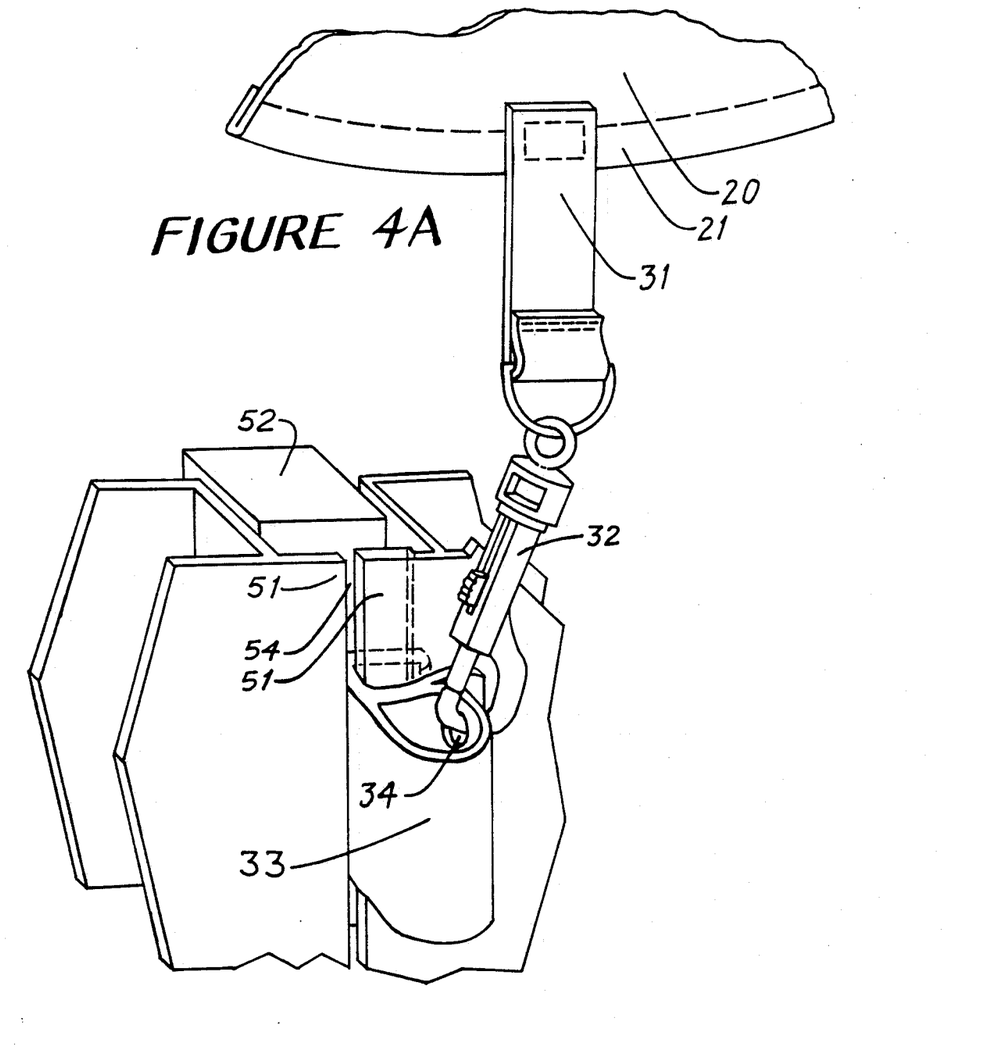
FIG. 4A is an enlarged perspective view of the first typical embodiment of the connecting system showing the system connected to the side of a door on the door's edge.

The first typical embodiment of the connecting system is shown in FIG. 4a and is described as follows. All parts of connecting system are shear resistant, of high-tensile strength, and resistant to common types of destruction. Connecting system includes arm 31, a fastener 32, and an anchor 33. Arm 31 is an elongated flexible member. Arm 31 has one end joined to hem 21. Free end of arm 31 is outside of vehicle 40 and is joined to fastener 32. Fastener 32 is releasably connected to anchor 33. Fastener 32 is similar to a spring loaded keyholder device. Anchor 33 has a receiver 34 which receives fastener 32. Anchor 33 is releasably connected to a door edge 51. Door 50 shall means any closure member which seals off and opens compartment 41 to the environment such as passenger compartment door, hood, trunk lid, or window of vehicle 40. Door edge 51 shall means the outermost peripheral edge around door 50. The installation, proper use, and fastening of anchor 33 to vehicle 40 causes no permanent damage or permanent alteration of any part of vehicle 40. Anchor 33 remains with vehicle 40 when cover 20 and the rest of the connecting system are removed from vehicle 40. Anchor 33 has a provision for being unfastened from door edge 51 by a human pulling and sliding anchor 33 off door edge 51. Anchor 33 may be unfastened and removed from door 50 only when door 50 is open. Anchor 33 is similar to a door edge protector device presently available. When door 50 is open or closed, anchor 33 resists being unfastened from door edge 51 by cause other than human effort. Anchor 33 resists being unfastened from door edge 51 by gripping door edge 51. When door 50 is closed, anchor 33 provides for prevention of unfastening or removal of anchor 33 from door edge 51. When door 50 is closed, the prevention of unfastening or removal of anchor 33 from door edge 51 is due to the rigidity and shape of at least a portion of anchor 33 preventing the rigid porition from passing out of an area adjacent to the inside surface of door edge 51 and preventing the rigid porition from then passing through a space 54 to the outside of vehicle 40. Space 54 shall mean the space between the door edge 51 and door frame 52 or the space between door edge 51 and another door edge 51 of an adjacent door 50, when door 50 is closed in either case. Door frame 52 shall mean the peripheral edge of the opening of door 50 defined by the body of vehicle 40 and the framing of the opening of door 50.

Figure 4B:
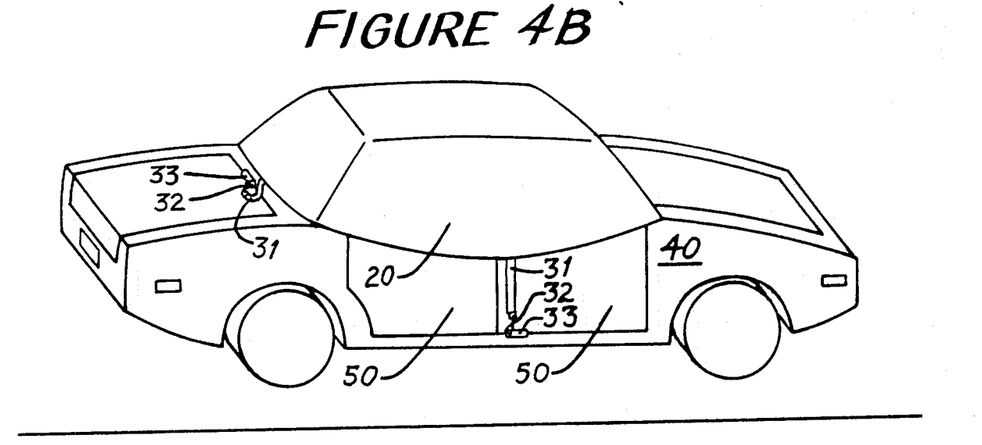
FIG. 4B is a perspective view of a cover connected to a vehicle at alternate locations on closure members of the vehicle by connecting systems like that shown in FIG. 4A.

FIG. 4b shows an alternative placement of the connecting system. Anchors 33 are attached to door edge 51 of doors 50 such as anchors 33 attached to the bottom edge of the passenger compartment's door and the edge of the trunk lid.

Figure 4C:
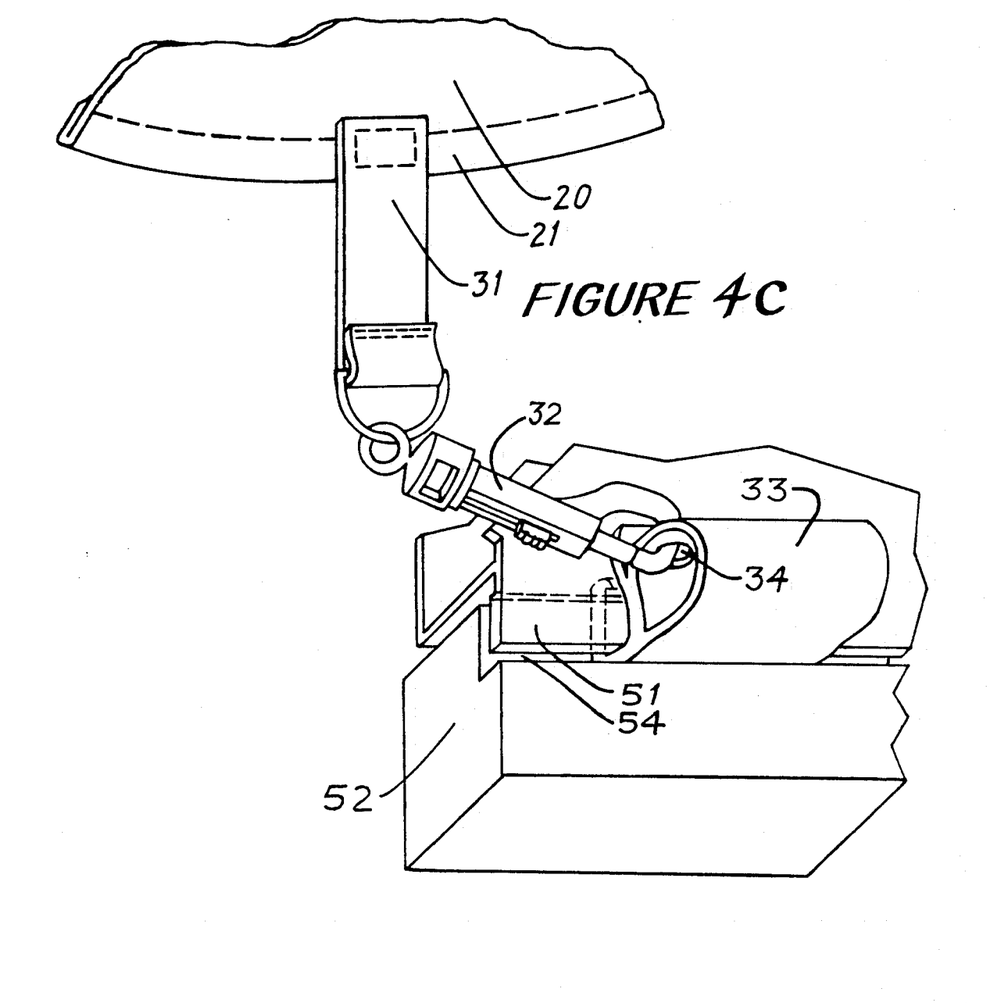
FIG. 4C is an enlarged perspective view of a connecting system like that of FIG. 4A but connected to the bottom of the door on the door's edge.

FIG. 4c shows another 33 attached to door edge 51 at the bottom of door 50 and adjacent to door frame 52. In most automobiles, the bottom edge of the passenger compartment's door 50 is adjacent to the bottom of door frame 52. This is different from FIG. 4a which shows the side edge of a passenger compartment's door 50 adjacent to the side edge of an adjacent door 50. The other side edge of door 50 is adjacent to the side of door frame 52; and, this arrangement is similar to that shown in FIG. 4c, except door frame 52 and door edge 51 would be shown oriented upright instead of horizontal.

Figure 5:
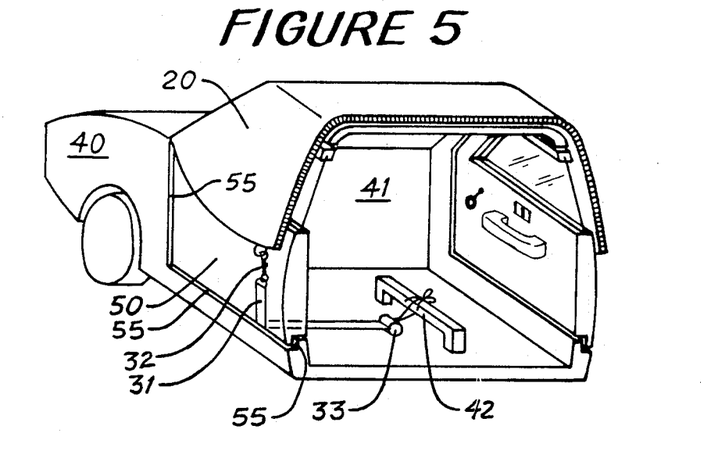
FIG. 5 is a perspective, cut-away view of the second typical embodiment of the connecting system showing the vehicle, cover, and alternative connecting system with an arm connected to a component secured to the interior of the passenger compartment.

The second typical embodiment of the connecting system is shown in FIG. 5 and is described as follows. Connecting system includes fastener 32, arm 31, and anchor 33. Cover 20 is releasably connected to fastener 32. Fastener 32 is joined to free end of arm 31. The free end of arm 31 is outside of vehicle 40. Arm 31 runs from outside of vehicle through a passage 55 and into the inside of compartment 41. A portion of arm 31 is located through passage 55. Passage 55 is the passage from the outside of vehicle 40, along a side of door 50, to the inside of compartment 41 when door 50 is closed. Passage 55 begins at any location adjacent to door edge 51 and adjacent to the exterior surface of door 50. Passage 55 then runs through space 54. Passage 55 then runs between side of door 50 and door frame 52. Passage 55 ends at interior of compartment 41. Arm 31 is flexible and shaped to permit a portion of arm 31 to be located through passage inside compartment 41. Anchor 33 is joined to a component 42 of vehicle 40 or to vehicle 40. Component 42 is not easily removed from vehicle 40 and is a secured part of vehicle 40. Component 42 may be part of vehicle 40 such as the illustrated rail which can secure a passenger chair to vehicle 40. Anchor 33 may be attached to component 42 by Velcro TM. Anchor 33 has a system for attaching anchor 33 to component 42 in compartment 41. Illustrating anchor 33 is tied to component 42 with string.

Figure 6:
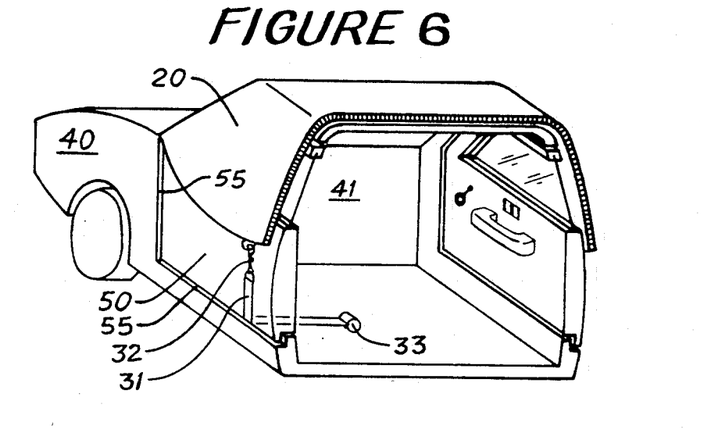
FIG. 6 is a perspective, cut-away view of the third typical embodiment of the connecting system showing the vehicle, cover, and an alternate connecting system with a large anchor secured to the system's arm lying inside the passenger compartment.

The third embodiment of the connecting system is shown in FIG. 6 and is described as follows. Connecting system includes fastener 32, arm 31, and anchor 33. Cover 20 is releasably connected to fastener 32. Fastener 32 is joined to free end of arm 31. The free end of arm 31 is outside of vehicle 40. Arm 31 runs from outside of vehicle through passage 55 and into the inside of compartment 41. A portion of arm 31 is located through passage 55. Arm 31 is flexible and shaped to permit a portion of arm 31 to be located through passage 55. Arm 31 is joined to anchor 33. Anchor 33 is located inside compartment 41. Anchor 33 is not joined to component 42 or vehicle 40. The rigidity and shape of at least a portion of anchor 33 prevents the rigid portion from passing through passage 55 to outside of vehicle 40.

Figure 7:
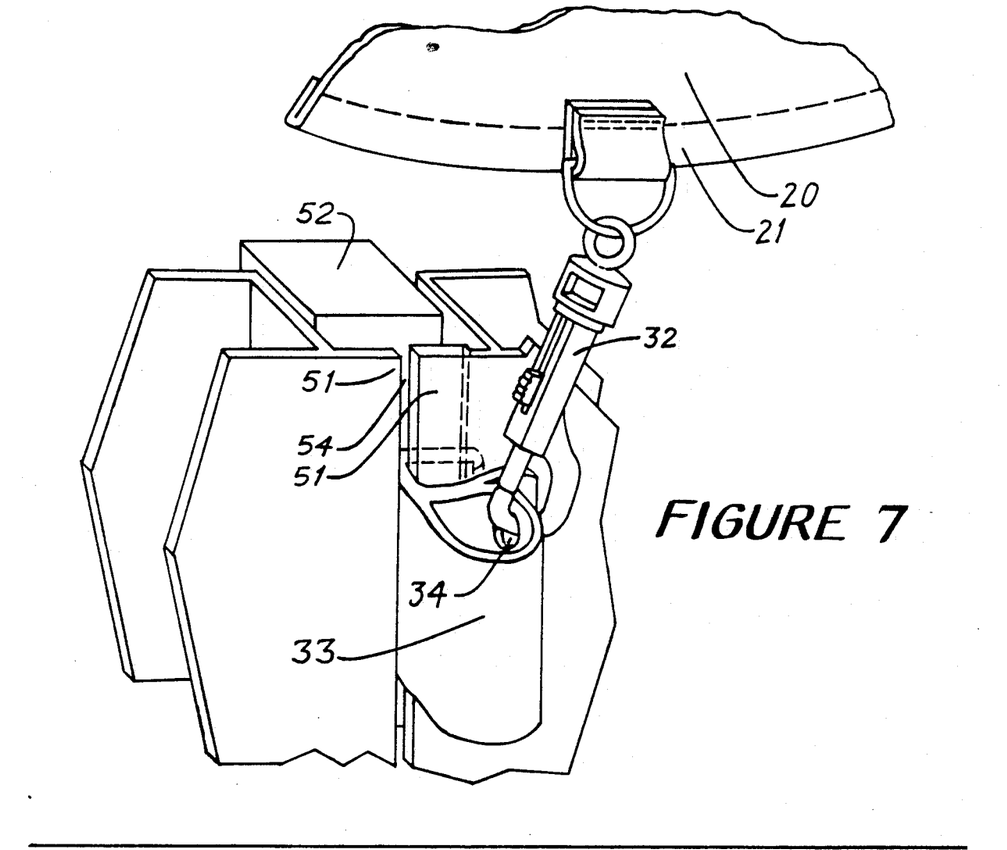
FIG. 7 is an enlarged perspective view of the fourth typical embodiment of the connecting system showing the system connected to a door edge without an arm member.

The fourth typical embodiment of the connecting system is shown in FIG. 7 and is describd as follows. Connecting system includes fastener 32 and anchor 33. Cover 20 is releasably connected to anchor 33 by fastener 32. Cover 20 is shaped so that a portion of the peripheral border of cover 20 is in close proximity to anchor 33. Anchor 33 is fastened to door edge 51 as described in the first typical embodiment of the connecting system.

Figure 8:
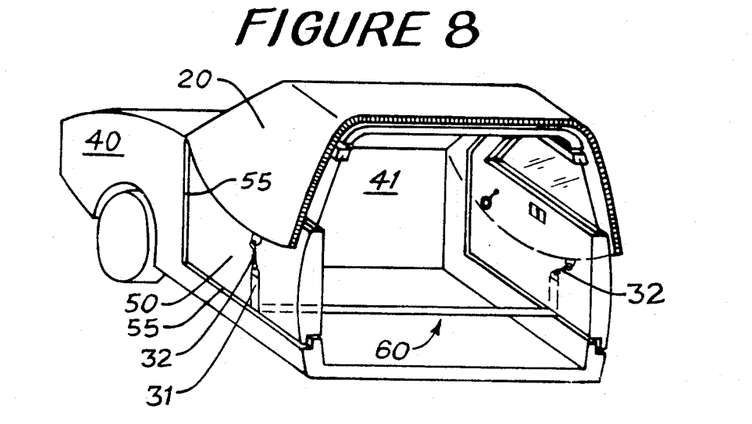
FIG. 8 is a perspective, cut-away view of the fifth typical embodiment of the connecting system showing the vehicle, cover, and a chain of one arm running through the passenger compartment and connected to opposite sides of the cover.

The fifth typical embodiment of the connecting system is shown in FIG. 8 and is described as follows. Connecting system includes arm 31 and fastener 32. The arrangement of one or more arms 31 located through passage 55 secures cover 20 to vehicle 40 when doors 50 are closed. Arms 31 and cover 20 are joined to form a continuous loop through the interior of compartment 41 and around the exterior of compartment 41. The exterior of compartment 41 is also the exterior of vehicle 40. Two or more arms 31 are joined to each other to form a chain 60 of arms 31. The two furthermost ends of chain 60 are joined to opposite sides of cover 20. Fastener 32 joins at least one arm 31 to another arm 31 or joins at least one arm 31 to cover 20. Fastener 32 is located outside of vehicle 40. Location of fastener 32 allows a person outside of vehicle 40 to have access to fastener 32. Chain 60 follows the following path: starting at an intial joint of chain 60 and cover 20 on intial side of compartment 41 (initial joint being outside of vehicle 40); thence, to and passing through passage 55 on initial side of compartment 41; thence, through compartment 41; thence, to and ending at a final joint chain 60 and cover 20 on the side cover 20 opposite initial joint (final joint being outside of vehicle 40).

Figure 9:
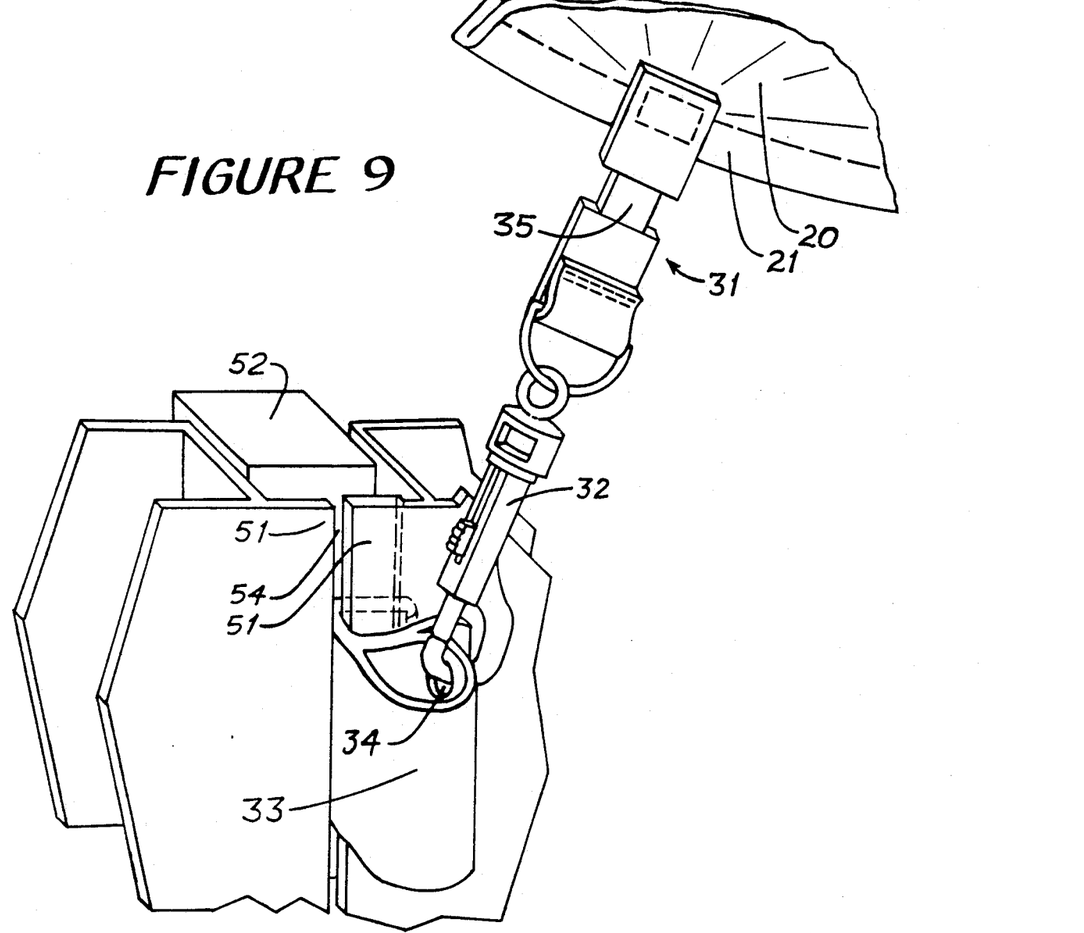
FIG. 9 is an enlarged perspective view of the sixth typical embodiment of the connecting system showing the system with an additonal pulling member in a taut condition.

The sixth typical embodiment of the connecting system is shown in FIG. 9 and is described as follows. The connecting system is similar to any of the previously described connecting systems. However, the connecting system also includes a pulling member 35 which applies a force of tension between vehicle 40 and cover 20. Pulling member 35 may be arm 31 made of an elastic material or pulling member 35 may be a separate member such as a spring.

Figure 10:
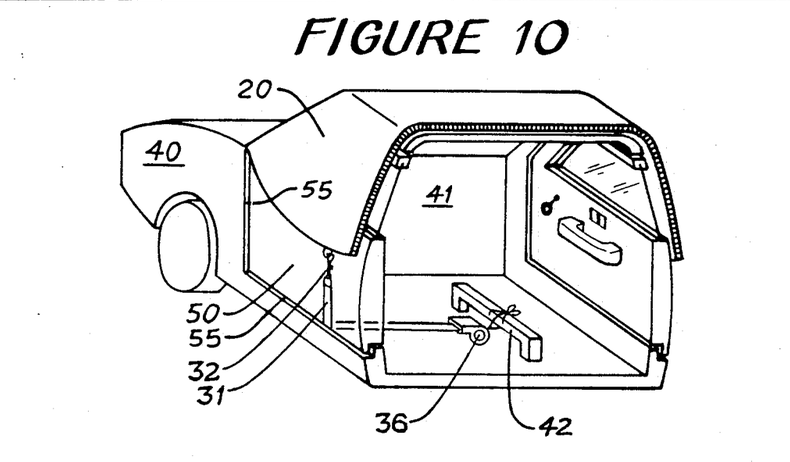
FIG. 10 is a perspective cut-away view of the seventh typical embodiment of the connecting system showing the vehicle, cover, connecting system with an arm running inside the passenger compartment, and an arm-retracting member connected to a component secured to the interior of the passenger compartment.

The seventh typical embodiment of the connecting system is shown in FIG. 10 and is described as follows. Connecting system is similar to any previously described connecting system. However, connecting system also includes a retracting member 36. Retracting member 36 may be a member very similar to a common seat-belt retracting device found in most automobiles or may be similar to a carpenter's tape-measure retracting device. Retracting member 36 gathers and contains a majority portion of arm 31. Retracting member 36 is located in compartment 41 and is secured to component 42 or to vehicle 40.

A typical embodiment of a combination of cover 20 and connecting system which together provide resistance against unauthorized persons entering vehicle 40 is described as follows. Cover 20 and any of the connecting systems described thus far are arranged and manufactured in a way that resists entry of an unauthorized person into vehicle 40. Strength, location, and continuity of hem 21 resists door 50 from being opened enough to provide space for an unauthorized person to pass between door 50 and door frame 52. Each side of cover 20 is connected to the nearest side of vehicle 40 by connecting system. If connecting system includes anchor 33, anchor 33 is fastened to component 42 in a way that prevents unfastening and removal of anchor 33 from component 42 by natural cause or unauthorized person. Connecting system includes one or more fasteners 32. Any fastener 32 that is located outside of vehicle 40 or that is accessible to unauthorized person reaching into compartment 41 is a lock.

OPERATION OF INVENTION

The following operations of the various embodiments of cover 20 and connecting system are described in instructional form.

To use any of the three typical embodiments of cover 20, close all doors 50 or keep them closed. Place the bundled or folded cover 20 on the roof of vehicle 40 above the top of passenger compartment 41. Begin at one side of cover 20 and drape each side of cover 20 down over each corresponding side of vehicle 40. For example, drape the side of cover 20 to be connected later to door 50 over the side of vehicle 40 having door 50. For cover 20 with ventilation system 37, first roll down or open the windows which will be covered by ventilation system 37. Then drape each side of cover 20 having ventilation system 37 down over each side of vehicle 40 having windows so that each ventilation system 37 covers as much open window area as possible. For cover 20 having bracing member 38, place cover 20 on roof so that the underside of cover 20 which is connected to bracing member 38 is also against the exterior surface of vehicle 40.

Before the connecting system of the first typical embodiment can be used, attach anchor 33 to vehicle 40. Slip anchor 33 on door edge 51 so that receiver 34 of anchor 33 is outside vehicle 40. To connect cover 20 to vehicle 40, first place cover 20 on vehicle 40 as previously described. Pull the free end of arm 31 near to anchor 33. Fastener 32 is already secured to the free end of arm 31. Connect fastener 32 to receiver 34. Anchor 33 may remain attached to door edge 52; however, anchor 33 can be removed by doing the reverse of the instructions for its attachment.

Before the second typical embodiment of the connecting system can be used, attach anchor 33 inside passenger compartment 41 to a secured component 42 of vehicle 40. If arm 31 is not already permanently secured to anchor 33, connect one end of arm 31 to anchor 33. To use connecting system, open door 50. Pull the free end of arm 31 to outside of vehicle 40. Close door 50. Place cover 20 on vehicle 40 as previously described. Connect the free end of arm 31 to cover 20 by using fastener 32. Anchor 33 and arm 31 may remain with vehicle 40 in compartment 41 when cover 20 is removed.

To use the third typical embodiment of the connecting system, first open door 50. Toss anchor 33 and the end of arm 31 that is attached to anchor 33 into passenger compartment 41. Keep the other end of arm 31, the free end, outside of vehicle 40 and close door 50. Place cover 20 on vehicle 40 as previously described. Connect the free end of arm 31 to cover 20 by using fastener 32. Anchor 33 and arm 31 may remain with vehicle 40 in compartment 41 when cover 20 is removed.

Using the fourth typical embodiment of the connecting system is very similar to using the first typical embodiment of the connecting system. However, since no arm 31 is involved, pull fastener 32 near to anchor 33. Fastener 32 is already attached to cover 20. Connect cover 20 directly to anchor 33 by using fastener 32. Anchor 33 may remain with vehicle 40 when cover 20 is removed.

To use the fifth typical embodiment of the connecting system, open door 50. Hold an initial end of chain 60 of arms 31 and toss the second end of chain 60 into passenger compartment 41 so that the second end is near to door 50 on the side of compartment 41 opposite the initial end of chain 60. Place the intial end of chain 60 outside of vehicle 40 and close door 50 on chain 60. Open door 50 near the second end of chain 60. Place second end of chain 60 outside of vehicle 40 and close door 50 on chain 60. Place cover 20 on vehicle 40 as previously described. Connect each end of chain 60 to corresponding side cover 20 by using fasteners 32. Chain 60 may be placed in and remain in compartment 41 when cover 20 is removed.

To remove cover 20 from vehicle 40 in any of the aforementioned connecting systems embodiments' operations, do the reverse of the previous instructions for that embodiment.

To connect cover 20 to vehicle 40 in a taut manner using pulling member 35 of the sixth typical embodiment of the connecting system, stretch pulling member 35 so that it is longer than its natural length. Keep the pulling member 35 stretched while connecting cover 20 to vehicle 40 using the desired connecting system embodiment.

To use arm 31 which is attached to retracting member 36 of the seventh typical embodiment of the connecting system, open door 50. Pull arm 31 out of retracting member 36. Pull arm 31 outside of vehicle 40. Close door 50 on portion of arm 31, and proceed with free end of arm 31 as required. When arm 31 is not needed, open door 50 to allow arm 31 to be freed, and let retracting member 36 gather and contain arm 31.

CONCLUSIONS, RAMIFICATIONS, AND SCOPE OF THE INVENTION

Thus, the reader will understand that my invention provides a cover and connecting system which shield the vehicle from elements of the environment, is quick and easy to use, is inexpensive, and does not cause much damage to the vehicle. The cover can be removed from the vehicle without having to open doors. The invention fulfills the objects and provides the advantages described in the OBJECTS AND ADVANTAGES section of my patent.

While the description above contains many specificities, these should not be construed as limitations of the scope of the invention, but rather as examples of preferred embodiments of the invention. Many other variations are possible. The following are examples of these variations.

Cover may have a size and shape to cover exterior surfaces of vehicle in addition to exterior surfaces of upper portion of passenger compartment.

Cover may have more than one connecting system simultaneously joined cover at different locations or at the same location.

Covers may grommets or other receivers for attachment of fasteners which allow arms to be joined to cover at any grommet or receiver location.

Cover may be made of layers of materials laminated to each other, partially joined to each other, or contained in the cover by being sandwiched between two other layers.

Cover may be comprised of a material that is any of the following: flexible, other than a fabric, a plastic sheet, impervious to water, not brittle when exposed to temperature below zero degrees celsius, not deforming or melting when exposed to temperature above twenty degrees celsius, opaque, not reflective of light, not reflective of radiant heat, heat absorbent on its underside surface, not adherent to ice or snow, elastic, shearable, or not of high tensile strength.

Cover may have magnets fixed to it to secure the cover to metal parts of the vehicle.

Cover may have an elasticized hem or a hem containing an elasticized member to cause the bottom of the cover to be held snug against the vehicle.

Cover may have bracing members which create an air space between the cover and the vehicle. Bracing members may be as simple as plastic form or rubber foam members joined to the inner surface of the cover.

Cover may be divided into two or more sections which may be joined to each other by fasteners to form a whole cover. The fasteners may be strips of velcro TM, snaps, buttons, eye and hook, grommet and nipple, zippers, or other fasteners.

Cover's ventilation system may be a material filled with holes, mesh material, screen material, or other perforated material. Preferably, the ventilation system is located on the cover over the vehicle's windows or portions of windows.

Cover may have a slit or hole in it to allow the vehicle's radio antenna to go through the cover.

A side of the cover may have a slit which allows a flap shaped portion of the cover to be moved away from a door to allow the door to be opened while the rest of the cover remains on the vehicle. The slit may run from the bottom of the cover and upward approximately along the edges of the door that the cover covers except for the door's edge which is hinged to the vehicle. The slit may end on the cover at the approximate location on the cover which is over the door's top nearest the windshield or front of the vehicle. The slit's edges or the cover's peripheral edges which form the slit may be releasably connected to each other by fasteners such as strips of velcro TM, zippers, snaps, tie strings, or other connecting devices.

Connecting system which includes arm may include any joined combination of one or more arms and one or more fasteners. Joined combination may be substituted for the arm.

Where any parts (part shall include cover, arm, fastener, and anchor) are connected to each other, except where the connection is by use of a fastener, the connection may be releasable, be resistant to separation, be inseparable, or be permanent in nature. Connection with a fastener implies that the connection is releasable.

Fastener may be a latch, lock, string for tying, magnets, button and button hole, hook, snap, or velcro TM. The fastener may connect the parts by screwing, tying, or clamping the parts together.

Anchor may have provisions for two or more arms to be joined to the same anchor simultaneously.

Connecting system or a number of parts of connecting system may be of an elastic material or may include springs which retract to their original size after being stretched larger than their original size. Thus, cover may be connected to vehicle in a taut manner by connecting systems providing the force of tension between the cover and the vehicle. This may be used present the cover from flapping in the wind.

Connecting system's chain of arms described in DESCRIPTION OF INVENTION may have a provision for its connection to a component of the vehicle in the passenger compartment.

Cover and connecting system may have a storage bag attached to either the cover or a part of the connecting system. The bag would be sized to have enough room to store and contain the cover. The bag may have enough room or have separate compartments for storage of parts of the connecting system. For example, the storage bag may have enough additional room to store arms and anchor members or have pockets for storing the anchor members.

Cover and connecting system may serve as a means to deter entry of an unauthorized person into a vehicle which is covered by the cover. Unauthorized person making a plan to enter vehicle by first removing part or all of the cover to provide passage of unauthorized person into vehicle would be deterred from putting plan into action by realizing that putting plan into action may visually alert an on-looking person that unauthorized person is removing cover and attempting to enter vehicle, and on-looking person may alert others who may apprehend unauthorized person.

Connecting system may include stopper knobs that can be attached to of adhered (with self-adhesive backing) to the lip of the door or closure member. The knobs may be attached to the lip at locations above and below an anchor that grips the door lip. The purpose of the knobs is to prevent the anchor from moving parallel to and along the lip of the door which the anchor grips. Use of the knobs is not to prevent removal of the anchor perpendicularly away from the door lip, nor to cause the releasably connected anchor to become permanently connected to the door or vehicle in any way.

Connecting system may include an adjusting device on the arm that provides for adjustment of the length of the arm. The purposes of the adjusting device is to allow the user of the cover to adjust and fix the length of the arm, and thereby provide a relatively snug fit of the cover to the vehicle.

All parts and materials of cover and connecting system may be made of materials that will not cause any part of cover, connecting system or vehicle to become rusted, scratched, mildewed, discolored, dented, or disfigured in any way.

Accordingly, the scope of my invention should be determined by the appended claims and their legal equivalents. The scope of my invention should not be determined by the embodiments illustrated or described.

I claim:

1. A shield including:
a cover means for shielding at least a majority portion of the exterior surface area around a passenger compartment of a vehicle from exposure to elements of the environment surrounding said vehicle, said vehicle being used for transportation of at least one person and having said passenger compartment and having at least one exterior closure member, said closure member meaning a door, a hood, or a lid of said vehicle,
at least one fastener means for releasable attachment outside said vehicle of said cover means and at least one anchor member to each other,
at least a portion of said anchor member being releasably held secure inside said vehicle by said closure member,
at least said portion of said anchor member that is inside vehicle being prevented from leaving said inside of said vehicle by said closure member blocking the path of said anchor member to the outside of said vehicle when said closure member is in its closed position,
said anchor member being releasably and removable from said vehicle only when said closure member is in its open position,
said anchor member being connected to said vehicle in such a manner that it can remain releasably connected to said vehicle regardless if said cover means is on or off said vehicle.

2. A shielding including:
a cover means for shielding at least a majority portion of the exterior surface area around passenger compartment of a vehicle from exposure to elements of the environment surrounding said vehicle, said vehicle being used for transportation of at least one person and having said passenger compartment and having at least one exterior closure member, said closure member having a door, a hood, or a lid of said vehicle,
at least one arm member providing for connection of said cover means to an anchor member across a space between said cover means and said anchor member,
at least one member for attachment of a top portion of said arm member to said cover means,
a majority portion of said arm member extending away from said cover means and toward said anchor member,
at least one fastener means for releasable attachment outside said vehicle of said arm member and said anchor member to each other,
at least a portion of said anchor member being releasably held secure inside said vehicle by said closure member,
at least said portion of said anchor member that is inside said vehicle being prevented from leaving said inside of said vehicle by said closure member blocking the path of said anchor member to the outside of said vehicle when said closure member is in its closed position,
said anchor member being releasable and removable from said vehicle only when said closure member in its open position,
said anchor member being connected to said vehicle in such a manner that it can remain releasably connected to said vehicle regardless if said cover means is on or off said vehicle.

3. A shield as claimed in claims 1 or 2 wherein said anchor member provides for releasable attachment of said anchor member to said closure member, said anchor member being releasable and removable from said closure member only when said closure member which said anchor member is releasably attached to is in its open position.

4. A shield as claimed in claims 1 or 2 wherein at least a securing portion of said anchor member is within exterior surfaces of said closure member when said closure member is in its closed position, said anchor member providing for prevention of passage of said securing portion through a gap around said closed closure member to the outside of said vehicle when said closure member is in its closed position.

5. A shield as claimed in claims 1 or 2 wherein said anchor member provides for connection of at least a mating portion of said fastener means to an edge of said closure member, said anchor member providing connection by gripping said edge, a first portion of said anchor member being adjacent to the outside surface of said edge, a second portion of said anchor member wrapping around the outermost portion of said edge, a third portion of said anchor member being adjacent to the inside surface of said edge, the rigidity and shape of at least said third portion preventing said third portion from passing between the outermost portion of said edge and an adjacent part of said vehicle to the outside of said vehicle when the gripped closure member which said anchor member grips is in its closed positioned, said adjacent part including the frame of the opening of said gripped closure member or the edge of another closure member adjacent to said gripped closure member when said gripped closure member is in its closed position, said anchor member being releasable from said gripped closure member only when said gripped closure member is in its opened position.

6. A shield including:
a cover means for shielding at least a majority portion of the exterior surface area around a passenger compartment of a vehicle from exposure to elements of the environment surrounding said vehicle, said vehicle being used for transportation of at least one person and having said passenger compartment and having at least one exterior closure member, said closure member meaning a door, a hood, or a lid of said vehicle,
at least one fastener means for releasable attachment outside said vehicle of said cover means and a top portion of an arm member to each other,
said arm member providing for connection of said cover means to said vehicle across a path from said cover means to the inside of a compartment of said vehicle, said compartment meaning a passenger compartment, a trunk, or a motor compartment of said vehicle unless specified by type of compartment, said arm member having a flexible portion adapted to extend from the outside of said vehicle and then through a passage between said closure member and the frame of the opening of said closure member when said closure member adjacent to said arm member is in its closed position and then to the inside of said compartment, said flexible portion being sandwiched in said passage when said adjacent closure member is in its closed position, a bottom portion of said arm member being inside said compartment, said bottom portion being releasably held secure inside said compartment by said adjacent closure member, said bottom portion that is inside said compartment being prevented from leaving said inside of said compartment by said adjacent closure member blocking the path of said bottom portion to the outside of said vehicle when said adjacent closure member is in its closed position, said bottom portion being releasable and removable from said vehicle only when said adjacent closure member is in its open position, said arm member being releasable from said cover means so that said arm member can be placed and remain inside said vehicle when said cover means is removed from said vehicle.

7. A shield as claimed in claim 6 further including a bulbous member attached to said bottom portion inside said compartment, the rigidity and shape of said bulbous member preventing said bottom portion from passing through said passage to the outside of said vehicle when said adjacent closure member is in its closed position.

8. A shield as claimed in claim 6 further including a means for releasable attachment of said bottom portion to a component of said vehicle inside said compartment, said component being fixed to said vehicle, said attachment means providing resistance against pulling away of said bottom portion from said component regardless if said adjacent closure member is in its opened or closed position.

9. A shield as claimed in claims 2 or 6 further including at least oen retracting means for gathering and containing at least a majority portion of said arm member.

10. A shield as claimed in claims 2 or 6 further including at least one pulling means for application of a force of tension between said cover means and said vehicle.

11. A shield as claimed in claims 2 or 6 further including at least one adjusting means for adjustment of the length of said arm member.

12. A shield as claimed in claims 1, 2, or 6 further including at least one locking means for prevention of removal of said cover means from said vehicle by an unauthorized person, said locking means being used in combination with or in place of said fastener means.

13. A shield as claimed in claims 1, 2, or 6 further including at least one ventilation means for allowing air to flow through at least a portion of said cover means, said ventilation means consisting of many small holes in at least a portion of said cover means.

14. A shield as claimed in claims 1, 2, or 6 further including at least one bracing means for supportiong at least a portion of said cover means away from said vehicle, said bracing means providing for maintenance of a space between at least a portion of said cover means and said vehicle.

15. A shield as claimed in claims 1, 2, or 6 further including a storage bag attached to said shield, said storage bag being of a size large enough to contain at least said cover means, said storage bag serving to contain at least said cover means when said cover means is not on said vehicle.

* * * * *